June 7, 1932.  J. U. LEHN  1,861,968
ANIMAL TRAP
Filed June 30, 1930

JOHN U. LEHN
INVENTOR

BY
ATTORNEY

Patented June 7, 1932

1,861,968

UNITED STATES PATENT OFFICE

JOHN U. LEHN, OF LITITZ, PENNSYLVANIA, ASSIGNOR TO ANIMAL TRAP COMPANY OF AMERICA, OF LITITZ, PENNSYLVANIA, A CORPORATION OF PENNSYLVANIA

ANIMAL TRAP

Application filed June 30, 1930. Serial No. 464,777.

This invention relates to spring actuated animal traps.

The main object of the invention is to provide an improved form of trap of the above character which can be more easily and more safely set than traps as hitherto constructed.

It is a further object of the invention to provide a spring actuated animal trap having simple and effective means to control the sensitivity of the setting thereof.

It is a still further object of the invention to provide an improved form of animal trap in which the retaining member or members for holding the jaws in open position are integrally formed with the bait-pan.

Further features and objects of the invention will be apparent from the following detailed description of one specific and convenient embodiment of the invention.

Reference is made to the accompanying drawing in which:—

Figure 1:
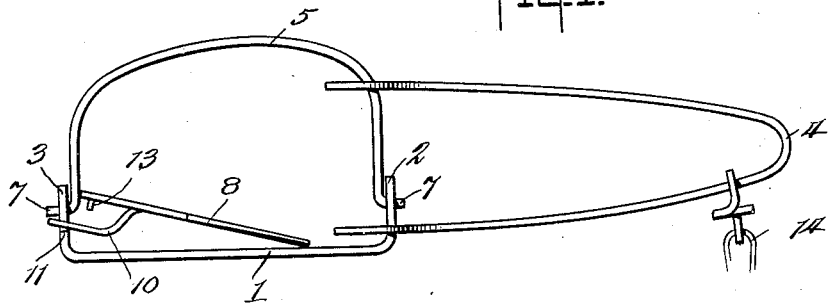
Figure 1 is a side elevation of one form of trap embodying the invention, the trap being in the sprung or closed position.
Figure 2:
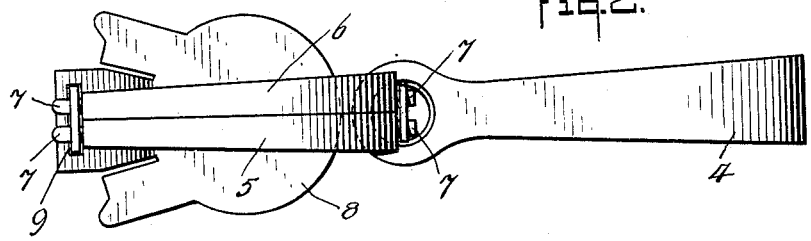
Figure 2 is a plan view of the trap shown in Figure 1.

In carrying the invention into effect in one convenient manner as illustrated in the accompanying drawing, I form the trap with a base member 1 having attached thereto or formed therewith at each end an upstanding post 2, 3, and attached to in any suitable manner or looped over one of the upstanding posts is one end of a spring member 4 whose apertured upper end engages jaws 5 and 6 in the usual manner.

At each end of each jaw is a pivot-pin or lug 7 which passes into an aperture in the upstanding post 2 or 3. The jaws thus can pivot in the usual manner under the control of the spring member 4 about an axis which is longitudinal of the trap.

Pivotally associated with one of the posts is a bait-pan 8, and the preferred method of pivoting the bait-pan upon the post is to form therein an aperture 9 through which the post 3 passes. The aperture 9 is preferably formed in a downturned lip 10 of the bait-pan which engages upon shoulders 11 on the upstanding post 3.

Figure 3:
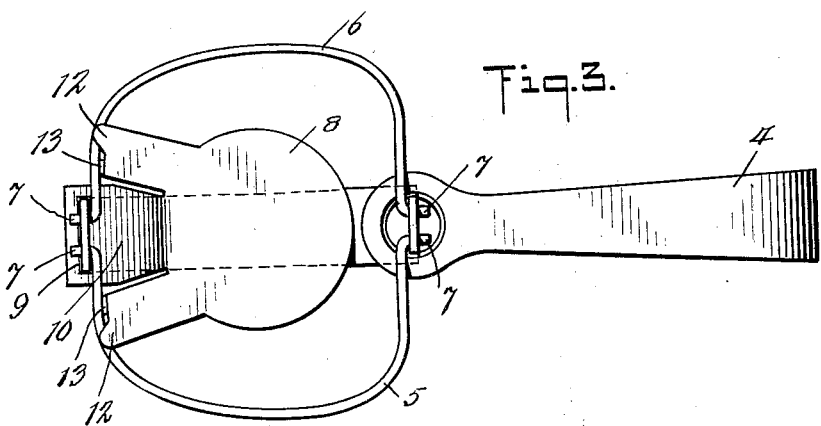
Figure 3 is a plan view of the same trap shown in the set or open position.
Figure 4:
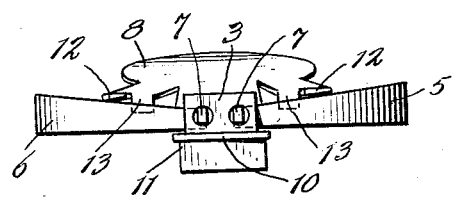
Figure 4 is an end on view of the trap as illustrated in Figure 3.

On, attached to, or preferably formed with the bait-pan 8 are extensions 12 arranged and adapted to contact with the upper edges of the jaws when they are in the open position shown in Figure 3. The extensions 12 are preferably in the same plane as the main portion of the bait-pan.

In a similar manner, on, attached to, or preferably formed with the bait-pan are lugs 13 adjacent to the extensions 12 and these lugs are adapted and arranged to contact with the innner surfaces of the jaws when the same are in the open position as shown in Figure 3. The lugs 13 are at an angle to the plane containing the bait-pan and the extensions 12, and according to the size of the angle the sensitivity of the setting of the trap can be adjusted and varied as will be indicated below.

A chain 14 for anchorage purposes may be provided if desired.

In setting the trap the spring 4 is compressed in the usual manner and the jaws 5 and 6 are opened, and when they are in this open position the bait-pan is pivoted on the post 3 so that the extensions 12 rest on the upper surfaces of the jaw members 5 and 6 the required extent of pivotation of the bait-pan being determined by the angular relation between the lugs 13 and the plane of the bait-pan. In the completely set position, the lugs 13 contact with the inner surfaces of the jaw members 5 and 6 and according to how far the extensions 12 project over the upper surfaces of the jaw members, (this being controlled by the contact of the lugs 13 with the inner surfaces of the jaw members) so the sensitivity of the trap is determined. The sensitivity of course depends on the angle or distance through which the bait-pan is to be moved by an animal before the trap is sprung.

For instance, if it is desired to obtain an extremely sensitive setting then the trap should be formed such that the lugs 13 are of such a length and make a small acute angle with the plane of the bait-pan so that only a small area of the extensions 12 rests on the jaws. On the other hand, if it is desired that the animal should move the bait-pan through a considerable distance before springing the trap then the angle which the lugs make with the bait-pan should be something approaching a right angle, so that the extensions contact with the jaws over a considerable area.

One convenient method of setting this trap is to grip the spring member 4 and compress the same so that the jaws can be opened and when the jaws are so opened all that is necessary is to turn the trap upside down and slightly release the spring. The turning of the trap in this manner moves the extensions 12 so that they lie within the path of the jaws 5 and 6 and when the spring acts upon these jaws, by being slightly released, the upper surfaces of the same contact with the extensions 12 and the trap is then set. It will be seen therefore that the setting is extremely simple and semi-automatic.

It is to be understood that the invention is not to be limited to any particular form of trap but can be applied to any spring actuated trap having a bait-pan and jaw members. It is furthermore to be understood that the example shown in the accompanying drawing is one of illustration and not of limitation.

I claim:—

1. An animal trap comprising spring means, jaw members and a bait-pan, extensions on and substantially coplanar with said bait-pan to contact with and hold said jaws in open position, and sensitivity control means on said pan.

2. An animal trap comprising spring means, a pair of jaws, an angularly movable bait-pan, extensions coplanar with said bait-pan and lugs on said bait-pan to contact respectively with the upper and inner surfaces of said jaws when in the open position.

3. An animal trap comprising spring means, a pair of pivoted jaws, an angularly movable bait-pan, extensions and lugs formed integrally with said bait-pan to contact respectively with the upper and inner surfaces of said jaws when in the open position, said lugs being at an angle to the plane of the bait-pan, said extensions being substantially coplanar with said bait-pan.

4. An animal trap comprising a base having upstanding posts, a pair of jaws pivoted to said posts and spring means operatively associated with said jaws, a bait-pan having an aperture, one of said posts extending through said aperture, extensions integral and coplanar with said bait-pan, downturned lugs on said bait-pan at an angle to the plane of the same, said extensions and lugs contacting respectively with the upper and inner surfaces of said jaws when in the open position.

In testimony whereof I affix my signature.
JOHN U. LEHN.